United States Patent

Wang et al.

(10) Patent No.: US 9,611,396 B2
(45) Date of Patent: Apr. 4, 2017

(54) CONDUCTING POLYMER NANOPARTICLE COMPOSITES

(71) Applicant: AnCatt Company, New Castle, DE (US)

(72) Inventors: Jianguo Wang, Newark, DE (US); Sue Wang, Newark, DE (US); Nar Wang, Newark, DE (US)

(73) Assignee: AnCatt, Newark, DE (US)

( * ) Notice: Subject to any disclaimer, the term of this patent is extended or adjusted under 35 U.S.C. 154(b) by 0 days.

(21) Appl. No.: 13/836,494

(22) Filed: Mar. 15, 2013

(65) Prior Publication Data

US 2014/0134423 A1 May 15, 2014

Related U.S. Application Data

(60) Provisional application No. 61/724,542, filed on Nov. 9, 2012.

(51) Int. Cl.
*C09D 5/08* (2006.01)
*H01B 1/12* (2006.01)
(Continued)

(52) U.S. Cl.
CPC ............ *C09D 5/08* (2013.01); *C08G 73/0266* (2013.01); *C08J 3/126* (2013.01); *C08L 77/06* (2013.01); *C09D 5/082* (2013.01); *H01B 1/124* (2013.01); *H01B 1/128* (2013.01); *C08J 2400/12* (2013.01); *C08J 2465/00* (2013.01); *C08K 9/08* (2013.01); *Y10T 428/249955* (2015.04); *Y10T 428/266* (2015.01); *Y10T 428/269* (2015.01); *Y10T 428/31511* (2015.04); *Y10T 428/31678* (2015.04); *Y10T 428/31725* (2015.04);
(Continued)

(58) Field of Classification Search
None
See application file for complete search history.

(56) References Cited

U.S. PATENT DOCUMENTS 4,419,137 A  12/1983 Cayless et al.
4,738,720 A   4/1988 Eckler et al.
(Continued)

OTHER PUBLICATIONS

Shchukin et al. (Self-Repairing Coatings Containing Active Nanoreservoirs, Small, 3, No. 6, 926-943 (2007)).*
(Continued)

*Primary Examiner* — Alexandre Ferre
(74) *Attorney, Agent, or Firm* — Joseph E. Maenner; Maenner & Associates, LLC

(57) ABSTRACT

The present disclosure relates to the preparation and application of conducting polymers nanoparticle composites. Specifically, the disclosure relates to the preparation of polyaniline, or similar conducting polymers, as polymer nanoparticles on substrates prepared by chemical polymerization of aniline on the surface or inside the pores of the substrate. Isolated polymerization, e.g. inside the pores, avoids the formation of aggregate polyaniline nanoparticles. The process of the present disclosure may be used for both inorganic and organic porous solids that are water insoluble, acid resistant, and resistant to oxidants such as ammonium persulfate. The conducting polymer nanoparticle composites may be used in a variety of applications, including as anticorrosion coatings.

18 Claims, 1 Drawing Sheet

(51) Int. Cl.
*C08G 73/02* (2006.01)
*C08L 77/06* (2006.01)
*C08J 3/12* (2006.01)
*C08K 9/08* (2006.01)

(52) U.S. Cl.
CPC ............... Y10T 428/31786 (2015.04); Y10T 428/31938 (2015.04)

(56) References Cited

U.S. PATENT DOCUMENTS

| | | | |
|---|---|---|---|
| 4,837,253 A | 6/1989 | Mansell et al. | |
| 4,849,257 A | 7/1989 | Borcher, Sr. et al. | |
| 4,899,624 A | 2/1990 | Bota et al. | |
| 4,946,886 A | 8/1990 | Nasu | |
| H856 H | 12/1990 | Kutik et al. | |
| 7,163,746 B2 * | 1/2007 | Savage et al. | 428/407 |
| 7,695,645 B2 * | 4/2010 | Lee et al. | 252/500 |
| 2003/0065090 A1 * | 4/2003 | Kelly | C08F 257/02 525/63 |
| 2008/0305341 A1 | 12/2008 | Plieth et al. | |
| 2009/0123939 A1 | 5/2009 | Alocilja et al. | |
| 2010/0129674 A1 | 5/2010 | Wei et al. | |

OTHER PUBLICATIONS

Karim (Synthesis and Characterization of Conducting Polyaniline-Activated Carbon Nanocomposites, J. of Appl. Poly. Sci. vol. 103, 1973-1977 (2007)).*
Hong et al. (Polyaniline-Nylon 6 Composite Nanowires Prepared by Emulsion Polymerization and Electrospinning Process, J. of Appl. Poly. Sci. vol. 99, 1277-1286 (2006)).*
Jing et al. (Preparation of an Epoxy/Polyaniline Composite Coatings and its Passivation Effect on Cold Rolled Steel, Polymer Journal, vol. 36, No. 5, 374-379 (2004)).*
Wang, Jianguo "Polyaniline Coatings: Anionic Membrane Nature and Bipolar Structures for Anticorrosion", Synthetic Metals, vol. 132, 2002, pp. 53-56.
Wang, Jianguo, et al., "Polyaniline-Related Ion-Barrier Anticorrosion Coatings II. Protection Behaviour of Polyaniline, Cationic, and Bipolar Films", Synthetic Metals, vol. 157, pp. 851-858.
Wicks, Zeno W., Jr., "Corrosion Protection by Coatings", Federation of Societies for Coatings Technology, Feb. 1987, pp. 7-22.
Smith, Alan, "Inorganic Primer Pigments", Federation of Societies for Coatings Technology, Nov. 1988, pp. 7-26.
Elvers, Barbara, "Ion Exchangers", Ullmann's Encyclopedia of Industrial Chemistry, 1989, vol. A 14, p. 456.
Webpage of W.R. Grace & Co., (www.grace.com), Shieldex® Non-Toxic Anti-Corrosive Pigments dated Jan. 15, 2014, 2 Pages.
Leidheiser, Henry Jr., "Electrical and Electrochemical Measurements as Predictors of Corrosion at the Metal-Organic Coating Interface", Progress in Organic Coatings, 1979, vol. 7, pp. 79-104.
International Search Report based on International Application No. PCT/US2013/069041, mailed Mar. 10, 2014; 2 Pages.
AnCatt, "RICE Alliance for Technology and Entrepreneurship: Most Promising Energy and Clean Tech Company Venture Award", www.nitc.org, accessed Nov. 6, 2015, 2 pages.
Coating Pro Magazine News, "A Short Write-Up of the Advantages of the Technology", www.coatingspromag.com, Jul. 2013, 1 page.
Frankel, "Corrosion Science in the $21^{st}$ Century", Journal of Corrosion Science and Engineering, Jul. 2003, vol. 6, 7-8.
NSF, "National Science Foundation SBIR 1 Award Announcement", www.nsf.gov, 2014, accessed Oct. 14, 2015, 2 pages.
Ramazzini, "TechConnect Innovation Spotlight: Revolutionary Environmentally Friendly Super Strength Anti-Corrosion Coating Platform", Article on National Innovation Award to AnCatt and the Breakthrough Nature of the Technology, www.TechConnect.org, 2014, accessed Oct. 14, 2015, 4 pgs.
TechConnect, "National Innovation Award: Listing the 2013 National and Global Innovation Awardees", www.techconnectworld.com, 2013, accessed Oct. 14, 2015, 3 pages.
Wang, et al., "Technology for Automotive Coatings", Painting & Coating Industry Magazine, Oct. 2013, vol. 29(10), 45-50.
Wicks, "Organic Coatings", Science and Technology, Third Edition, Wiley-Interscience Publications, 2007, p. 150.
Norden, B., "The Nobel Prize in Chemistry, 2000: Conductive Polymers", Advanced Information, Kungl. Vetenskapskademien, The Royal Swedish Academy of Sciences, 2000,1, 1-16.
Rani, A. and Basu, B.B., "Green Inhibitors for Corrosion Protection of Metals and Alloys: An Overview", International Journal of Corrosion, 2011, Sep. 26, 2012, 15 pages.
SCAQMD-Rule 1113. Architectural Coatings, Feb. 5, 2016, 1113-1-1113-24.

* cited by examiner

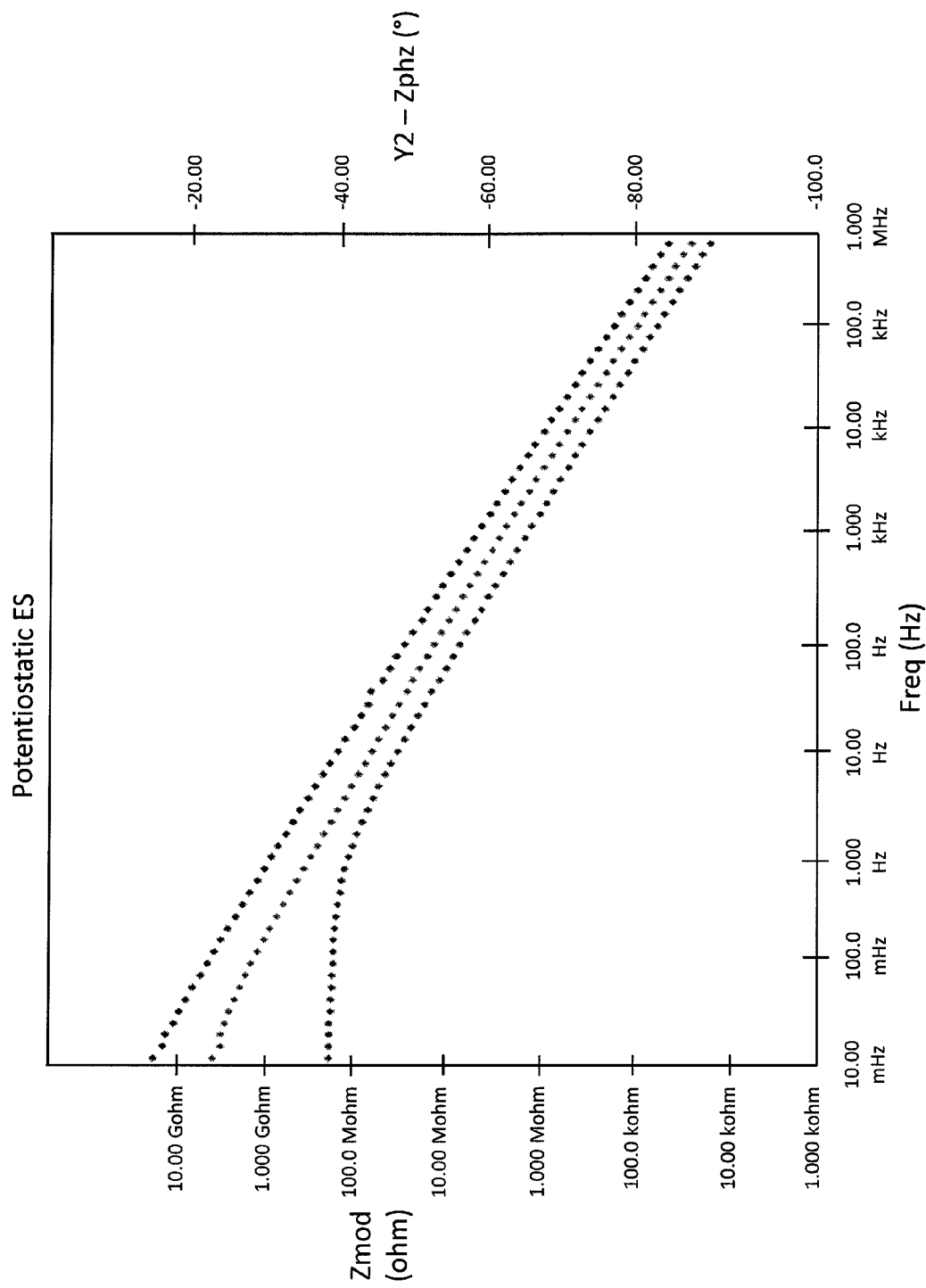

CONDUCTING POLYMER NANOPARTICLE COMPOSITES

CROSS-REFERENCE TO RELATED APPLICATIONS

This application claims priority to U.S. Provisional Application Ser. No. 61/724,542 filed Nov. 9, 2012, the entire contents of which is incorporated herein by reference.

FIELD OF THE INVENTION

The present disclosure relates to the preparation and application of conducting polymer nanoparticle composites. Specifically, the present disclosure relates to the preparation and application of conducting polymers as nanoparticles in or on substrates (i.e, conducting polymer nanoparticle composites).

BACKGROUND OF THE INVENTION

Conductive polymers are of great interest for many commercial applications such as electrode materials, batteries, antistatic materials, anticorrosion coatings, adhesives, electromagnetic shielding materials, photoelectric transducers, optical memories, display devices, various hybrid materials, transparent electro conductors, LED, electro-optic devices, photocells, circuit boards pretreatments, electron beam photo resistive agents, and various sensors.

Unfortunately, conducting polymers, such as polyaniline and polypyrrole, have poor mechanical properties that make them difficult to process into meaningful end products. Due to their poor processability, manufacturing costs, material inconsistencies, and poor solubility in solvents, conductive polymers have few large-scale applications.

A need exists for a new method to prepare unique compositions of conductive polymers that overcome their poor mechanical properties and utilize these materials in diverse applications.

SUMMARY OF THE INVENTION

The present disclosure relates to methods of preparing conducting polymer nanoparticle composites that may be dispersed in a matrix, and compositions comprising the same. These conducting polymer nanoparticle compositions may be formed into high performance novel materials for application in many industrial fields.

In one embodiment, the present disclosure relates to a conducting polymer nanoparticle composite comprising a conducting polymer nanoparticle, and a substrate, wherein the conducting polymer nanoparticle is contained on the surface of the substrate, as well as articles containing the same.

In another embodiment, the present disclosure relates to a method of preparing a conducting polymer composite comprising providing a substrate, combining the substrate with a solution including a monomer of a conducting polymer to form a suspension, mixing the suspension to wet the substrate with the solution, wherein at least a portion of the monomer interacts with the surface, separating any excess bulk solution from the wetted substrate, and polymerizing the monomer.

In a further embodiment, the present disclosure relates to a corrosion inhibiting coating composition for coating a metal substrate comprising a topcoat layer, and a primer layer having a conducting polymer nanoparticle composite, wherein the composite includes a conducting polymer nanoparticle, and a substrate, wherein the conducting polymer nanoparticle is contained on the surface of the substrate.

BRIEF DESCRIPTION OF THE DRAWINGS

FIG. 1 shows Bode plots of the pore resistance for different embodiments of the present disclosure wherein topcoat-primer systems having conducting polymer nanoparticle composites are immersed in 3.5 wt. % sodium chloride solution.

DETAILED DESCRIPTION OF THE INVENTION

Described herein is a composition containing a conductive polymer nanoparticle composite, and methods of preparing the same. The conductive polymer nanoparticle composites can be utilized in many diverse applications. For instance, the present disclosure relates to a unique preparation method for conductive polymer nanoparticle composites as well as the application of conductive polymers as anticorrosion pigments in coatings.

In one embodiment, the present disclosure relates to a conducting polymer nanoparticle composite comprising a conducting polymer nanoparticle, and a substrate, wherein the conducting polymer nanoparticle is contained on the surface of the substrate.

As used herein, the term "conducting polymer" refers to intrinsically conducting polymers, or ICPs, which include organic polymers that conduct electricity. Conducting polymers may have metallic conductivity or may be useful as semiconductors. Examples of conducting polymers include polyaniline (PAn) and polypyrrole (Ppy).

The conducting polymer may be any polymer known to one skilled in the art as a conducting polymer. For example, the conducting polymer may be substituted or unsubstituted polyaniline, substituted or unsubstituted polypyrrole, or combinations thereof.

The aniline monomer used to make the substituted or unsubstituted PAn can be un-substituted aniline or substituted aniline having a structure of formula (I):

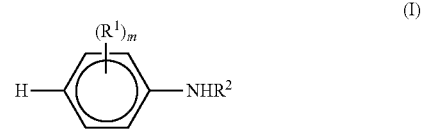

wherein $R^1$ and $R^2$ are independently selected from the group consisting of H, OH, COOH, I, F, $NO_2$, $NH_2$, substituted or unsubstituted $C_1$-$C_6$ alkyl, and substituted or unsubstituted $C_1$-$C_6$ alkoxy groups; and m is 0-4.

The pyrrole monomer used to make the substituted or unsubstituted Ppy can be un-substituted pyrrole or substituted pyrrole, such as N-methylpyrrole, $C_4H_4NCH_3$.

As used herein, the term "nanoparticle" refers to a polymer particle having one or more dimensions (e.g. diameter) measuring about the order of 100 nm or less. The size and shape of the nanoparticle may vary. The present disclosure relates to a method to obtain nanoparticles by limiting agglomeration. For example, the morphological subunit of polyaniline, for example, is small, such as about a 3.5 nm particle unit. These units may agglomerate to bigger particles. Preferably, the polymer nanoparticles are between about 3.5 nm and about 500 nm, and more preferably between about 10 nm and about 100 nm.

The substrate may be any known substrate particle known to one skilled in the art as a suitable substrate. For example, the substrate may be a silica bead, a pigment, an inorganic solid, an organic solid, or combinations thereof.

The substrate may also be substantially insoluble in an aqueous or semi-aqueous solution, and stable in a dilute acidic solution. The substrate should be able to remain insoluble during preparation in the polymerization solution (e.g. a dilute acidic aqueous or semi-aqueous solution). In one embodiment, the substrate is water insoluble. Suitable inorganic solids for use as a substrate include aluminas, silicas, alumina-silicas, zeolites, etc. Suitable organic/polymer solids for use as a substrate include synthetic rubber, phenol formaldehyde resin (or Bakelite®), neoprene, nylon, polyvinyl chloride (PVC or vinyl), polystyrene, polyethylene, polypropylene, polyacrylonitrile, PVB, silicone, DER™ 680-20, cation exchange resin C-249, Nylon 6,6 resin and 3GT, etc. Suitable pigments for use as a substrate include talc, barium sulfate, titanium dioxide, mica, calcium borosilicate, phosphosilicates, molybdate pigments, barium metaborate, zinc phosphate, etc.

In another embodiment, the substrate is acid resistant. In a further embodiment, the substrate is oxidant resistant. For example, the substrate does not substantially degrade in the presence of an oxidant, such as ammonium persulfate.

The substrate may also be a porous solid. The conducting polymer nanoparticle may be at least partially inside a pore on the porous solid. The surface area of a substrate particle includes its geometric surface area and the area of its pore wall. The pore diameter may be small to limit the aggregation of the polymer nanoparticles when monomers polymerize inside the pores. The total pore value of a porous solid is V (cc/g), the specific surface area is S ($m^2$/g), and the average pore diameter is R. R can be estimated as R=2V/S. For example, a porous solid with a total pore value of about 0.3 cc/g (V~0.3 cc/g) and a specific surface area of about 5 $m^2$/g (S~5 $m^2$/g) has an average pore diameter of about 120 nm. For a porous solid with a surface area as low as 1 $m^2$/g, the average pore diameter is 600 nm.

Preferably, the porous solid of the present disclosure may have a total pore value of about 0.05 cc/g to about 0.80 cc/g. More preferably, the total pore value may be about 0.1 cc/g to about 0.50 cc/g. The porous solid may also have a preferred specific surface area of about 0.5 $m^2$/g to about 1200 $m^2$/g. More preferably, the preferred specific surface area may be about 0.5 $m^2$/g to about 50 $m^2$/g. Finally, the porous solid of the present disclosure may have an average pore size of about 5 nm to about 5000 nm, and more preferably about 50 nm to about 2000 nm.

Porosity or void fraction is a measure of the void (i.e., "empty") spaces in a material, and is a fraction of the volume of voids over the total volume, between 0-1, or as a percentage between 0-100%. Porous substrates of the present disclosure may have a porosity between about 5% to about 70%, and preferably between about 10% and about 50%.

The average particle size of the substrate particles is preferably smaller than about 80 mesh. Substrate particles may be screened to remove bigger particles by passing the particles through an about 80 to 100 mesh sieve. In one embodiment, the average diameter of the substrate particles is between about 250 nm and about 5000 nm. Preferably, the average diameter of the substrate particles is between about 450 nm and about 3000 nm. More preferably, the average diameter of the substrate particles is between about 500 nm and about 2000 nm.

The substrate may also be a solid with a non-smooth surface. With regard to a porous solid or solid with a non-smooth surface, the conducting polymer nanoparticle may be contained in or on the surface of the substrate. The conducting polymer may be contained on the surface and inside, or partially inside, the porous solid or non-smooth surface.

The substrate may have local areas where monomers of a conducting polymer are present when the substrate is wetted with a solution having such monomers. Upon polymerization, these monomers may form discrete nanoparticles. For example, when a porous solid is wetted with a solution containing a monomer of a conducting polymer, the monomer may collect inside the pores of the porous solid. Upon polymerization, monomers form a conducting polymer nanoparticle within the pore.

The amount of conducting polymer nanoparticle in the composite may vary depending on the polymer, the substrate and the application or article for use with. Preferably, the weight percent of conducting polymer nanoparticle in the composite is between about 0.1% and about 50%. More preferably, the weight percent of conducting polymer nanoparticle in the composite is between about 0.5% and about 25%. Even more preferably, the weight percent of conducting polymer nanoparticle in the composite is between about 3% and about 15%.

Broadly, the conductive polymer nanoparticle composites may be prepared by immersing a particle in a monomer solution and initiating polymerization. The monomers which are adsorbed on the particle surface or are in the solution close to the surface may polymerize and precipitate on the surface as polymer nanoparticles. If a sufficient amount of bulk solution remains, the monomers in the bulk solution may polymerize and aggregate with the polymer nanoparticles on the surface. General polymerization from the bulk solution may result in a build up of an aggregated polymer layer around the entire particle surface. The present disclosure utilizes polymerization with limited or no bulk solution to form a composite of polymer nanoparticles on and/or within the solids particles. It have been discovered that formation of substantially non-contiguous conducting polymer nanoparticles on the surface of a substrate is preferred over the formation of conducting polymer networks in solution or the formation of conducting polymer networks as a substantially contiguous layer on the substrate.

In one embodiment, the present disclosure relates to a method of preparing a conducting polymer nanoparticle composite comprising providing a substrate, preferably with a non-smooth or porous surface, combining the substrate with a solution including a monomer of a conducting polymer to form a suspension, mixing the suspension to wet the substrate with the solution, wherein at least a portion of the monomer interacts with the porous or non-smooth surface, separating any excess bulk solution from the wetted substrate, and polymerizing the monomer.

Wetting the substrate may allow the monomer to interact with the substrate surface. For a non-smooth or porous solid, wetting the solid allows the monomer to enter into the non-smooth areas or pores of the solid. These areas may collect a greater proportion of the monomer than other smooth or non-porous regions of the surface.

Any remaining excess bulk solution of monomer may be removed from the wetted substrate. Removal of the bulk solution limits the amount of monomer outside of the surface irregularities. It has been found that limiting the amount of monomer in the bulk solution or on the smooth or non-porous surface of a substrate assists the formation of conducting polymer nanoparticles on the substrate surface. The removal of excess monomer by removal of the bulk solution and the non-uniform distribution of the monomer on the surface of the substrate limit the formation of aggregated conducting polymer particles or a contiguous over layer of conducting polymer on the substrate surface. Limiting aggregated conducting polymer particles reduces the precipitate of such particles on the surface of the substrate and the formation of a contiguous conducting polymer over-layer.

Polymerization of the monomer may be initiated by any means known to one skilled in the art. For example, polymerization of the conducting monomers may be initiated by oxidation. Suitable oxidizing agents include ammonium persulfate, potassium dichromate, potassium iodate, ferric chloride, potassium permanganate, potassium bromate, and potassium chlorate.

For example, an acidic solution of aniline may be combined with a porous pigment powder. The combination may be mixed until the powder is completely wet with solution. Preferably, the aniline is collected in the pores of the pigment. Any remaining bulk solution may be removed from the mixture. An oxidant solution may then be mixed with the combination. The oxidant solution functions to initiate polymerization of the monomer. The mixture may be stirred for an addition time, e.g. 30 minutes. The mixture may be rinsed with distilled water, filtered and dried. The resulting product is a pigment powder having conducting polymer nanoparticles contained within, or partially within, its pores.

The pH of the acidic aniline solution may be less than about 4. The acidic pH may be obtained using any acid including inorganic or organic acids, such as phosphoric acid, hydrochloric acid, sulphuric acid, nitric acid, acetic acid, organic sulphonic acid, for example para-toluene sulphonic acid, dodecel benzene sulphonic acid, methane sulphonic acid, benzene sulphonic acid.

Without being bound by any particular theory, it is believed the monomers collect in the pores, or are absorbed into the pores, by capillary effect. The amount of monomer collected in the pores may be determined by knowing the concentration of monomer in solution and measuring the amount of solution absorbed into the pores.

The conducting polymer nanoparticles composites may be used in many diverse applications and on many different articles. The conducting polymer nanoparticle composites may be used as anticorrosive primer, electrostatic dissipation coatings, electromagnetic interference shielding, static resistant fibers or textiles, conductive ink or toner, or as conductive adhesives. The conducting polymer nanoparticle composites may be used with articles such as windmills, transportation infrastructure of highways, bridges, containers and storage tanks, off-shore oil platforms, metal structures, automobiles, rail cars, and petrochemical plants, military aircraft and missiles, commercial passenger aircrafts, cargo holds and cargo tanks, decks, and ships.

For example, the conducting polymer nanoparticle composites may be used in anticorrosive coatings. Unextracted metal usually exists in its stable oxidized state as an ore. Extracted metal has a tendency to react with its environment and form a corresponding oxide. This process of oxide formation leads to deterioration and is called corrosion. Certain conditions, such as the existence of aggressive anions, can accelerate corrosion. Chloride and sulfate ions are two of the more aggressive anions and their presence will accelerate the corrosion of metal when contacted with a metal surface.

The use of an organic coating on a metal substrate is one of the most important approaches to reduce corrosion. Such organic coatings often contain an anticorrosive pigment to improve corrosion protection. An anticorrosion coating system usually consists of multiple coating layers including a primer layer; one or more inter layer(s), and a topcoat layer.

Anticorrosive pigments include inhibitive pigments, sacrificial pigments, barrier pigments and cation exchange pigments. Inhibitive pigments include chromates, phosphates, molybdates, borates, red lead etc. Sacrificial pigments include metallic zinc. Barrier pigments include aluminum flake and steel flake. For a review of inhibitive, sacrificial and barrier pigments see Alan Smith, "Inorganic Primer Pigments" Published by Federation of Societies for Coating Technology. Philadelphia, Pa., 19107. Conducting polymer nanoparticles composites, as well as cation exchange pigments, however, are preferred anticorrosive materials because they can be formulated with less toxic and less carcinogenic effects.

Anticorrosive coatings having a conducting polymer nanoparticles composite may be able to prevent oxygen, water, and aggressive anions in the environment from arriving at or near, or contacting, the substrate metal surface and degrading or corroding the metal.

Organic coatings on a metal substrate may be used to reduce corrosion. These coatings usually consist of multiple layers including a primer layer; inter layer(s), and a topcoat layer ("topcoat"). The primer layer is the layer directly coated on the metal surface. Primer layers may provide adhesion of the overall coating to the metal surface. The primer layer may consist of a vehicle (e.g., resin binder), a solvent (except in 100% solids coatings), a pigment, a filler (except for clear coatings) and additives. The primer layer excludes the normal washing, cleaning and other pre-treatment steps or applications used to prepare a corrodible metal substrate for coating. For example, the primer layer excludes Bonderite® 1303 which converts the metal surface to a nonmetallic amorphous, complex oxide layer. The surface is still an inorganic layer as opposed to an organic coating layer, as described herein.

Examples of primer layers include epoxy primers, organic zinc rich primers, inorganic zinc rich primers, powder coating primers and wash primers. Epoxy primers may be two-pack materials utilizing epoxy resins and either a polyamide or polyamine curing agents. They may be pigmented with a variety of inhibitive and non-inhibitive pigments. Zinc phosphate epoxy primers are the most frequently encountered.

The coatings may also optionally contain one or more inter layers between the primer layer and topcoat. Most coatings, including automotive, aerospace, aircraft and marine coatings, contain multiple layers including inter layers. The inter layer may serve as a barrier in the coating system, as well as adding film thickness or "build." Generally, the thicker the coating the longer the life. The inter layer may also provide adhesion between the primer layer and the topcoat. Some inter layers have special functions, for example, the inter layer of an automotive coating may provide color.

Inter layers may consist of a vehicle (e.g., resin binder), a solvent (except in 100% solids coatings), a pigment, a filler (except for clear coatings) and additives. Most inter layers are an epoxy inter layer.

The topcoat is the outmost layer of the coating composition. The topcoat is often used to provide a required appearance and surface resistance to the system. Depending on the conditions of exposure, it may also provide the first line of defense against weather and sunlight, open exposure, condensation (as on the undersides of bridges), highly polluted atmospheres, impact and abrasion, and bacteria and fungi.

Topcoats may consist of a vehicle (e.g., resin binder), a solvent (except in 100% solids coatings), a pigment, a filler (except for clear coatings) and additives. Topcoats differ from primer layer and inter layers, in part, due to their function and specific additive that may be present in the topcoats to achieve the specific functions. Examples of topcoat formulations may include epoxy topcoats, polyurethane topcoats, alkyd topcoats, water borne topcoats, high temperature resistant topcoats, topcoat of powder coatings and PVC topcoats.

The coating composition of the present disclosure has at least two layers, a primer layer and a topcoat layer. The primer layer may contain at least one conducting polymer nanoparticle composite and may function to prevent or reduce corrosion of the underlying material. The topcoat layer may be any distinct layer above the primer layer which acts a topcoat layer or is traditionally considered a topcoat layer. The quality and quantity of the conducting polymer nanoparticle composite in the primer is sufficient to allow the primer to prevent or reduce corrosion of the underlying material. The incorporation of at least one conducting polymer nanoparticle composite in the primer layer may inhibit anions found in the environment from interacting with the substrate. Accordingly, the primer layer having at least on conducting polymer nanoparticle composite may provide substantial anticorrosive protection to the metal substrate, particularly in the environments of aggressive anions.

In one embodiment, the present disclosure relates to a corrosion inhibiting coating composition for coating a metal substrate comprising a topcoat layer, and a primer layer having a conducting polymer nanoparticle composite, wherein the composite includes a conducting polymer nanoparticle, and a substrate, wherein the conducting polymer nanoparticle is contained on the surface of the substrate.

The substrate to be protected may be any metal or metal containing material or composite that is subject to corrosion, particularly by aggressive anions. The substrate may include steel, galvanized steel, aluminum, aluminum alloys, zinc, zinc alloys, magnesium, and magnesium alloys.

The primer layer may have variable amounts of conducting polymer nanoparticle composite depending on the type of polymer, substrate, application or article for use with. Preferably, the weight percent of conducting polymer nanoparticle composite in the primer layer is about 0.05% to about 50%. More preferably, the weight percent of conducting polymer nanoparticle composite in the primer layer is about 0.5% to about 35%. Even more preferably, the weight percent of conducting polymer nanoparticle composite in the primer layer is about 0.5% to about 15%.

The inter layer(s) and/or the topcoat layer may also contain a conducting polymer nanoparticle composite or other anticorrosive compound. The anticorrosive compound may also be in the primer layer. The conducting polymer nanoparticle composite or other anticorrosive compound may be any known in the art to provide anticorrosion resistance. The anticorrosive compound may be the same or different with respect to each other or with respect to the conducting polymer nanoparticle composite in the primer layer. The amount of anticorrosive compound in the primer, inter layer(s) and/or the topcoat layer may range from about 0.05 to about 50 weight percent in each layer. Preferably, the amount may range from about 3 to about 35 weight percent in each layer. In some embodiments, a conducting polymer nanoparticle composite or other anticorrosive compound may be present in both primer layer and topcoat layer, both the primer layer and an inter layer, or the primer layer, an inter layer and the topcoat layer. In other embodiments, the inter layer(s) and topcoat may also be free or substantially free of other traditionally considered corrosion inhibitors.

The coating materials may be applied to form a coating having an average thickness from about 0.1 to about 6 mils, preferably from about 0.2 to about 3 mils.

All references cited in this disclosure are incorporated by reference in their entirety.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Examples 1 through 8 demonstrate how to make specific conducting polymer nanoparticle composites. Examples 9-11 demonstrate the use of the composites as anticorrosion pigments.

Example 1

Preparation of Polyaniline on Talc Powders 6 g of p-toluensulfonic acid monohydrate (>98% Lot & filling Code 133665 22507418 Fluka) was dissolved in 45 g of distilled water to form a PTSA solution. Then, 2.0 g of aniline (>99% Batch 127K0669, SIGMA) was dissolved in the PTSA solution. The acidic aniline solution was mixed with 98 g of talc powders having a median diameter of about 1.8 microns (Mistron ultramix Lot T08192, Imerys) and stirred until the mixture was homogeneously wetted and there was no solution left as bulk solution. 1.3 g of ammonium persulphate (Purified, Science Lab) was dissolved in ~10 g distilled water, and then mixed with the wet powders. The mixture was stirred until the color of the powder changed to light green. The powders were rinsed with distilled water, the aqueous liquor filtered off and the powders dried at 50-60° C. to produce the product.

Example 2

Preparation of Polyaniline on Titanium Dioxide 3.6 g of p-toluensulfonic acid monohydrate (>98% Lot & filling Code 133665 22507418 Fluka) was dissolved in 46 g of distilled water (PTSA solution). Then, 2.5 g of aniline (>99% Batch 127K0669, SIGMA) was dissolved in the PTSA solution. The acidic aniline solution was mixed with 97.5 g of titanium dioxide (Ti-Pure 931, median diameter is 0.55 microns, DuPont Co.) and stirred until the mixture was homogeneously wetted and there was no solution left as bulk solution. 1.5 g of ammonium persulphate (Purified, Science Lab) and 3 g of p-toluensulfonic acid monohydrate (>98% Lot & filling Code 133665 22507418 Fluka) was dissolved in ~20 g distilled water, and then mixed with the wet powders. The mixture was stirred until the color of the powder changed to light green. The powders were rinsed with distilled water, the aqueous liquor filtered off and the powders dried at 50-60° C. to produce the product.

Example 3

Preparation of Polyaniline on Barium Sulfate 7.9 g of p-toluensulfonic acid monohydrate (>98% Lot & filling Code 133665 22507418 Fluka) was dissolved in 40 g of distilled water (PTSA solution). Then, 2.0 g of aniline (>99% Science Stuff Inc., Lot #107501) was dissolved in the PTSA solution. The acidic aniline solution was mixed with 198 g of barium sulfate (Exbar4, Excalibar Minerals Inc.) and stirred until the mixture was homogeneously wetted and there was no solution left as bulk solution. 1.8 g of ammonium persulphate (ScienceLab.com Inc.) dissolved in ~5 g distilled water, and then mixed with the wet powders. The mixture was stirred until the color of the powder changed to light green. The powders were rinsed with distilled water, the aqueous liquor filtered off and the powders dried at 50-60° C. to produce the product.

Example 4

Preparation of Polyaniline on Epoxy Resin D.E.R.™ 680-20

1 g of sulfuric acid (3M) was dissolved in 10 g of distilled water. Then, 1.0 g of aniline (>99% Science Stuff Inc., Lot #107501) was dissolved in the acid solution. The acidic aniline solution was mixed with 20 g of D.E.R.™ 680-20 epoxy resin powder (~80 mesh) (Dow Chemical Co.) and stirred until the mixture was homogeneously wetted and there was no bulk solution left. 3 hours later, dissolved 0.5 g of ammonium persulphate (ScienceLab.com Inc.) in ~5 g water, and then mixed with the wet powders. The mixture was stirred for 1 hour, and the color of the powder changed to dark green. The powders were rinsed with 200 ml distilled water, the aqueous liquor filtered off and the powders dried at 50-60° C. to produce the product.

Example 5

Preparation of Polyaniline on Epoxy Resin D.E.R.™ 611

8 g of sulfuric acid (3M) was dissolved in 66 g of distilled water. Then, 3.0 g of aniline (>99% Science Stuff Inc., Lot #107501) was dissolved in the acid solution. The acidic aniline solution was mixed with 97 g of D.E.R.™ 680-20 epoxy resin powder (~80 mesh) (Dow Chemical Co.) and stirred until the mixture was homogeneously wetted and there was no solution left as bulk solution. Dissolved 2 g of ammonium persulphate (ScienceLab.com Inc.) in ~5 g water, and then mixed with the wet powders. The mixture was stirred for 1 hour, and the color of the powder changed to dark green. The powders were neutralized with 14.0 g of NaOH solution (20 wt. %), then rinsed with 200 ml distilled water, the aqueous liquor filtered off and the powders dried at 50-60° C. to produce the product.

Example 6

Preparation of Polyaniline on Cation Exchange Resin C-249

2 g of aniline (>99% Science Stuff Inc., Lot #107501) dissolved in 5.5 ml of 6N hydrochloric acid (Carolina Biological Supply Co.). The acidic aniline solution was mixed with 8 g of C-249 resin powder (Batch PA13C$_1$, powder Lanxess Sybron Co.). Stirred until the mixture was homogeneously wetted and there was no bulk solution left. Dissolved 1.5 g of ammonium persulphate (ScienceLab.com Inc.) in 6 g distilled water, and then mixed with the wet powders. The color of the mixture was immediately changed to dark green. Continued the stirring for 30 minutes and rinsed the powder with 20 ml distilled water, the aqueous liquor filtered off and the powders dried at 50-60° C. to produce the product.

Example 7

Preparation of Polyaniline on Nylon-6,6 Resin 6.5 ml of 6N hydrochloric acid (Carolina Biological Supply Co) was dissolved in 8 g of distilled water. Then, 2.5 g of aniline (>99% Science Stuff Inc., Lot #107501) was dissolved in the acid solution. The acidic aniline solution was mixed with 50 g of Nylon 6,6 resin powder (~80 mesh) and stirred until the mixture was homogeneously wetted and there was no bulk solution left. Dissolved 1.5 g of ammonium persulphate (ScienceLab.com Inc.) in 6 g distilled water, and then mixed with the wet powders. The mixture was stirred for 1 hour, and the color of the powder changed to dark green. Rinsed the powder with 100 ml distilled water, the aqueous liquor filtered off and the powders dried at 50-60° C. to produce the product.

Example 8

Preparation of Polyaniline on 3GT Polyester Resin 6.5 ml of 6N hydrochloric acid (Carolina Biological Supply Co) was dissolved in 6 g of distilled water. Then, 2.5 g of aniline (>99% Science Stuff Inc., Lot #107501) was dissolved in the acid solution. The acidic aniline solution was mixed with 50 g of 3GT polyester resin powder (~80 mesh) and stirred until the mixture was homogeneously wetted and there was no bulk solution left. Dissolved 1.5 g of ammonium persulphate (ScienceLab.com Inc.) in 6 g distilled water, and then mixed with the wet powders. The mixture was stirred for 1 hour, and the color of the powder changed to dark green. Rinsed the powder with 100 ml distilled water, the aqueous liquor filtered off and the powders dried at 50-60° C. to produce the product.

Example 9

Preparation of Epoxy Primer Using the Composite of Polyaniline/Talc as Anticorrosion Pigment Part A:—The following materials are mixed together and fully blended in a 300 mL ceramic jar ball mill overnight:

| Material | Amount | Function | Supplier/Lot # |
|---|---|---|---|
| D.E.R ™ 324 epoxy resin | 100 g | Binder | The Dow Chemical Co. Lot# YH0501M134 |
| BYK ®-355 | 8 g | Additive | BYK additives & Instruments. Lot# 0704684400 |

-continued

| Material | Amount | Function | Supplier/Lot # |
|---|---|---|---|
| Additol ® XL 480 | 1.3 g | Additive | Cytec Co. |
| Modaflow 9200 | 0.65 g | Additive | Cytec Co. |
| PAn/Talc | 33 g | Anticorrosion Pigment | From Example 1 |
| Barium sulfate | 33 g | Filler | Exbar4, Excalibar Minerals Inc |
| TiO$_2$ | 6.5 g | Filler | DuPont Co. Ti-Pure, Lot#343775 |
| Natural Red Pigment | 6.5 g | Color Pigment/Filler | Hoover Color Co. Hoover P-7, Lot # F9417 |
| Methyl Ethyl Ketone | 20 g | Solvent | Barr Co. |

Part B: Ancamine® 2074 Curing Agent, Air Products Co. Lot #040004127188

Parts A and B are mixed together in a 1 to 0.22 ratio (wt.) of A to B. After 30 minute of the mixing, the mixture was used as a primer to coat cold rolls steel (CRS) panels. The size of the panels is 7.5 cm×7.5 cm×0.08 cm. The panels are not pretreated before application of the primer paint. A wire-wound rod of 100 um (BYK additives & Instruments) was used to apply the primer paint on the substrates. The coated panels are dried at RT for several hours. The thickness of the dried primer layer is approximately 40 micrometers on the steel panels.

Example 10

Preparation of Wash Primer Using the Composite of Polyaniline/Talc as Anticorrosion Pigment The following materials are mixed together and fully blended in a 300 ml ceramic jar ball mill overnight:

| Material | Amount | Function | Supplier/Lot # |
|---|---|---|---|
| Polyvinyl butyral B90 | 15 g | binder | Solutia Co. SL# S10322603T44830017. |
| Beckpox EP128 | 13.9 g | binder | Cytec Co. Lot# 120019760 |
| Phenodur PR 612/80B | 7.0 g | binder | Cytec Co. |
| A187 | 0.75 g | additive | Momentive performance Materials Co. |
| Polyaniline/Talc | 27 g | Anticorrosion pigment | From Example 1 |
| Excal CW-3 Calcium carbonate | 2.9 g | filler | Excalibar Minerals Inc. |
| TiO$_2$ | 5.0 g | filler | DuPont Co. Ti-Pure, Lot#343775 |
| Acetone | 2 g | solvent | Barr Co. |
| Methyl Ethyl Ketone | 20 g | solvent | Barr Co. |
| Ethyl Alcohol, 95% denatured | 20 g | solvent | Carolina Biological Supply Co. |
| Isobutyl alcohol, ACS Grade | 20 g | solvent | Carolina Biological Supply Co. |
| n-butyl alcohol Reagent grade | 20 g | solvent | Carolina Biological Supply Co. |
| Distilled water | 0.8 g | solvent | Walgreen Co. |

Part B: Mixture of 23.5 g of phosphoric acid (85% ACS reagent, ScienceLab.com) with 76.5 g of n-butyl alcohol (Carolina Biological Supply Co.)

Parts A and B are mixed together in a 1 to 0.35 ratio (wt.) of A to B. After 30 minute of the mixing, the paint material was used as a primer to coat cold rolls steel (CRS) panels and aluminum panels (Q panel Co.). The size of the panels is 7.5 cm×7.5 cm×0.08 cm. The panels are not pretreated before application of the primer paint. A wire-wound rod of 100 um (BYK additives & Instruments) was used to apply the primer paint on the substrates. The coated panels are dried at RT for one hours. The thickness of the dried primer layer is approximately 15 micrometers on the steel panels.

Example 11

Preparation of Waterborne Primer Using the Composite of Polyaniline/talc as Anticorrosion Pigment Part A—The following materials are mixed together and fully blended in a 300 ml ceramic jar ball mill overnight:

| Material | Amount | Function | Supplier/Lot # |
|---|---|---|---|
| BECKPOX EP 386w/52 WA | 96.8 g | Water borne epoxy resin | Cytec Co./Lot 130054037 |
| VXW 6208 | 3.7 g | Additive | Cytec Co./Lot 210085979 |
| VXW 6393 | 0.65 g | Additive | Cytec Co./Lot 210059639 |
| Distilled water | 20 g | Solvent | Walgreen Co. |
| Ti-select 6200 wol (TiO2) | 16 g | Filler | DuPont Co./Lot# 390428 |
| Polyaniline/Talc | 24 g | Anticorrosion pigment | Example 1 |
| BaSO4 | 10 g | Filler | Excalibar Minerals Inc |

Part B—The following materials are mixed together and fully blended.

| Material | Amount | Function | Supplier/Lot # |
|---|---|---|---|
| BECKOPOX VEH 2188/55WA | 138.84 g | Waterborne Epoxy Hardener | Cytec Co. |
| Distilled Water | 18.93 g | Solvent | Walgreen Co/ |

Parts A and B are mixed together in a 1 to 0.21 ratio (wt.) of A to B. After the mixing, the paint material was used as a primer to coat cold rolls steel (CRS) panels and aluminum panels (Q panel Co.). The size of the panels is 7.5 cm×7.5 cm×0.08 cm. The panels are not pretreated before application of the primer paint. A wire-wound rod of 100 um (BYK additives & Instruments) was used to apply the primer paint on the substrates. The coated panels are dried at RT for several hours. The thickness of the dried primer layer is approximately ~35 micrometers on the steel panels.

Example 12

Apply Topcoat on the Primers of Example 9-Example 11

A commercially available paint material IMRON® 2.1 HG-C™ (DuPont Co.) was used as the topcoat paint for the primers of Example 9-Example 11. 3 parts of IMRON® 2.1 HG-C™ were mixed with 1 part of IMRON® FG-1333™ by stirring. A wire-wound rod of 100 um (BYK additives & Instruments) was used to apply the topcoat on the primers. The topcoat was dried at RT overnight. The thickness of the topcoat layer was approximately 45 micrometers on the surface of primers.

Example 13

Electrochemical Characterization of the Primer—Topcoat Systems of Example 12

The topcoat-primer coating systems of Example 12 were characterized by Electrochemical Impedance Spectroscopy (EIS). The EIS measurement was using a Gamry Instruments model reference 600™ Potentiostat/Galvanostat with corrosion system software. A three-electrode cell was setup. The counter electrode was a graphite rod (r~3 mm), the reference electrode was a saturated calomel electrode (SCE), and the working electrode was the coated metal panel of which the exposed area to the electrolyte solution was ~3.5 cm². The electrolyte solution was a 3.5 wt. % aqueous solution of sodium chloride. Electrochemical Analyst software was used to get the EIS data. An important EIS data is the pore resistance Rpo which is the resistance for ionic transport through a coating layer. A coating that maintained a resistance of $10^8$ Ohm cm² provides good corrosion protection while one having a resistance below $10^6$ Ohm cm² does not.

The Bode plots of EIS are show on FIG. 1. The following table shows the pore resistance, or Rpo value, for the topcoat-primer systems immersed in 3.5 wt. % sodium chloride solution.

| Sample ID | Top coat | Primer | Rpo (Ohm cm²) | Immersion hours |
|---|---|---|---|---|
| 12A | Example 12 (IMRON ® 2.1 HG-C ™) | Ex. 9 | $3.9 \times 10^{10}$ | 350 |
| 12B | Example 12 (IMRON ® 2.1 HG-C ™) | Ex. 10 | $3.5 \times 10^8$ | 350 |
| 12C | Example 12 (IMRON ® 2.1 HG-C ™) | Ex. 11 | $7 \times 10^9$ | 350 |

All the Rpo values are higher than $10^8$ Ohm cm² over 300 hours immersion in 3.5 wt. % sodium chloride solution demonstrating the corrosion resistance provided by the primer layer having a conducting polymer nanoparticle composite.

What is claimed is:

1. An anti-corrosive conducting polymer nanoparticle composite in powder form comprising:
   (i) conducting polymer nanoparticles wherein the conducting polymer is selected from the group consisting essentially of substituted or unsubstituted polyaniline and substituted or unsubstituted polypyrrole;
   (ii) substrate particles having a geometric surface area and a pore wall surface area, wherein the conducting polymer nanoparticles form a noncontiguous layer on the geometry surface and in and around the pore wall surface area of the substrate particles;
   wherein the nanoparticles have a diameter of about 3.5 nm to about 500 nm;
   wherein the substrate particle has a diameter larger than 1 micron; and
   wherein the weight percent of the nanoparticle in the composite is between about 0.1% to about 50%.

2. The composite of claim 1, wherein the substituted or unsubstituted polyaniline has a structure of formula (I):

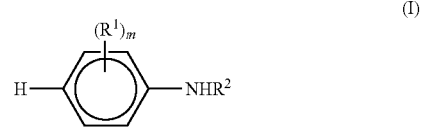

wherein $R^1$ and $R^2$ are independently selected from the group consisting of H, OH, COOH, I, F, $NO_2$, $NH_2$, substituted or unsubstituted $C_1$-$C_6$ alkyl, and substituted or unsubstituted $C_1$-$C_6$ alkoxy groups; and m is 0 to 4.

3. The composite of claim 1, wherein the substrate is selected from the group consisting of an inorganic solid and an organic solid, and wherein the substrate is substantially insoluble in an aqueous or semi-aqueous solution and stable in a dilute acidic solution.

4. The composite of claim 3, wherein the substrate is selected from the group consisting of alumina, silica, alumina-silica, zeolite, synthetic rubber, phenol formaldehyde resin, neoprene, nylon, polyvinyl chloride, polystyrene, polyethylene, polypropylene, polyacrylonitrile, PVB, silicone, talc, barium sulfate, titanium dioxide, mica, calcium borosilicate, phosphosilicate, molybdate pigment, barium metaborate, zinc phosphate, epoxy resin, cation exchange resin C-249, Nylon 6,6 resin, 3GT polyester resin and combinations thereof.

5. The composite of claim 1, wherein the weight percent of the nanoparticles in the composite is between about 0.05 wt. % and about 25 wt. %.

6. An article comprising a conducting polymer nanoparticle composite of claim 1.

7. The conducting polymer nanoparticle composite of claim 1, wherein the substrate is selected from inorganic particles.

8. The conducting polymer nanoparticle composite of claim 1, wherein the substrate is selected from phenol formaldehyde, polyester, polyvinyl chloride, polystyrene, polyethylene, and polypropylene resin particles.

9. The conducting polymer nanoparticle composite of claim 1, wherein the substrate is selected from nylon and 3GT polyester resin particles.

10. The conducting polymer nanoparticle composite of claim 1, wherein the substrate is selected from epoxy particles.

11. The conducting polymer nanoparticle composite of claim 1, wherein the substrate is selected from cation exchange resin particles.

12. A corrosion inhibiting coating composition for coating a metal substrate comprising a layer having a conducting polymer nanoparticle composite in powder form, wherein the coating composition includes:
   (i) the composite of claim 1, wherein the substrate is selected from a inorganic pigment; and
   (ii) the conducting polymer nanoparticle composite is mixed with the coating resin(s), fillers, additives, and solvents to form a coating composition, wherein the coating composition is free of other corrosion inhibitors.

13. The coating composition of claim 12 wherein the layer includes about 0.3% to about 3% weight percent of conducting polymer.

14. The coating composition of claim 12, wherein layer having the conducting polymer nanoparticle composite inhibits ions found in an environment surrounding the coating composition from interacting with the metal substrate hereby inhibiting the metal corrosion.

15. The coating composition of claim 12 with a topcoat provide at least $3.6 \times 10^8$ Ohm of pore resistance while immersed in 3.5 wt % sodium chloride solution.

16. The coating composition of claim 12, wherein the coating resins are both solvent based resins and water base resins.

17. An anti-corrosive conducting polymer nanoparticle composite in powder form comprising:
(i) conducting polymer nanoparticles, wherein the conducting polymer is polyaniline; and
(ii) a substrate particle comprising an external surface and pores with an internal surface, wherein the conducting polymer nanoparticles form a noncontiguous layer in the internal surface of the substrate particle, said substrate particle comprising one or more of epoxy, cation exchange resin particles, nylon, polyester, polyvinyl chloride, polystyrene, polyethylene, and polypropylene resin particles,
wherein the conducting particle nanoparticles have a diameter of about 3.5nm to about 500 nm;
wherein the substrate particle has a diameter larger than 1 micron; and
wherein the weight percent of the nanoparticle in the composite is between about 0.5 wt. % to about 35 wt. %.

18. An anti-corrosive polymer nanoparticle composite in powder form comprising:
(i) polymer nanoparticles;
(ii) substrate particles having a geometric surface area and a pore wall surface area, wherein the polymer nanoparticles form a noncontiguous layer on the geometry surface and in and around the pore wall surface area of the substrate particles;
wherein the nanoparticles have a diameter of about 3.5 nm to about 500 nm;
wherein the substrate particle has a diameter larger than 1 micron; and
wherein the weight percent of the nanoparticle in the composite is between about 0.1% to about 50%.

* * * * *